United States Patent [19]
Nightengale

[11] Patent Number: 6,033,014
[45] Date of Patent: Mar. 7, 2000

[54] PORTABLE GAME TABLE ASSEMBLY

[76] Inventor: Jeffery L. Nightengale, 311 James Dr., Heath, Tex. 75087-8839

[21] Appl. No.: 09/048,669

[22] Filed: Mar. 26, 1998

[51] Int. Cl.⁷ .................................................. A47B 39/00
[52] U.S. Cl. ............................ 297/174; 108/42; 297/172
[58] Field of Search .................................. 297/172, 173, 297/174, 250.1; 108/43, 42

[56] References Cited

U.S. PATENT DOCUMENTS

| | | | |
|---|---|---|---|
| 3,160,437 | 12/1964 | Hill | 297/174 |
| 4,798,411 | 1/1989 | Lin | 297/174 X |
| 4,803,930 | 2/1989 | Crocoli | 108/42 X |
| 5,452,936 | 9/1995 | Koehring | 297/172 |
| 5,452,950 | 9/1995 | Crenshaw et al. | 297/174 X |
| 5,470,128 | 11/1995 | Kerkham | 297/172 X |
| 5,520,119 | 5/1996 | Eisenberg | 108/43 |

*Primary Examiner*—Peter M. Cuomo
*Assistant Examiner*—Stephen Vu

*Attorney, Agent, or Firm*—Gardere & Wynne, L.L.P.; John W. Montgomery

[57] ABSTRACT

A portable table is provided with a seat that is temporarily anchorable to a chair by sifting thereon. A slidable member is slidably held by the seat and disposed in a plane generally parallel to the seat. The slidable member has a proximal end slidably connected to the seat and has a distal end slidable to a position space generally in front of the seat. A first hinge is attached to the distal end of the slidable member and has a closed hinge position and an open hinge position. A foldable member is attached at a proximal end to the first hinge and is attached at a far end to a second hinge. The second hinge has a closed hinge position and an open hinge position, such that when the first hinge is in its open hinge position, the foldable member is disposed upwardly from the slidable member. A table is attached to the second hinge on the far end of the foldable member, such that when the first and second hinges are in their respective open hinge positions, the table is spaced apart from and in front of the seat and is positioned generally parallel thereto for access by a user seated on the seat.

9 Claims, 4 Drawing Sheets

PORTABLE GAME TABLE ASSEMBLY

TECHNICAL FIELD

This invention relates to a portable tables in general and more particularly to a portable game table assembly

BACKGROUND OF THE INVENTION

Today video games are commonly played by many children and adults. In many video systems a conventional television receiver displays an image generated by the computerized game system. Various types of manual controllers including joy sticks, power balls, and steering wheels may be connected to the game system and used to control the video game. Many households do not have a permanent game table or other table in the room with their television receiver, therefore the option of placing the game controller on a table is not available. For aesthetic reasons many households do not want to have a permanent table in the room with their television receiver.

Without a table on which to rest the controller, players frequently position the controller on the floor or in the player's lap. The problem is exaggerated when the controller is the steering wheel type such as those typically used in race car type video games. Holding the steering wheel controller in the lap may be uncomfortable and may be unstable. Positioning the steering wheel on the floor may also be uncomfortable because it requires the player to bend over the wheel in an uncomfortable position while playing the video game. Therefore, a long-felt need exist for a portable table capable of being anchored to an existing seating device and particularly for a portable game table for use with video game controllers.

It is one object of the invention to provide a game table that is usable with and supported from existing chairs, sofas, other seating devices, beds and floors.

It is another object of the invention to provide a portable table that is assembled with a seat and extendable forward of the seat to a desired distance. Further, it is an object to provide a stop on the slidable member to prevent over extension.

It is a further object of the invention to provide a portable table assembly that is anchored in position by sitting on a seat.

It is also an object of the invention to provide a portable folding table having a table surface held by the table assembly at a position raised above the horizontal height of a seat that it is temporarily anchored to a chair or other seating device by a user sitting on the seat. An adjustment mechanism provides an adjustable angle of presentation of the tabletop surface to a user seated on the seat.

It is yet another object to provide a portable game table and seat combination assembly having a slidable member attached to the seat and extendable forward of the seat with a stop to prevent over extension. The game table is foldable upward relative to the slidable member and downward toward horizontal and to an adjustable angle of presentations to a user seated on the seat.

SUMMARY OF THE INVENTION

The present invention comprises a portable table assembly. A seat of the assembly is temporarily anchorable to a chair or other seating surface by sitting thereon. A slidable member is anchored to and extendable in a generally horizontal plane from the front of the seat. A first hinge is disposed on the distal end of the slidable member in front of the seat. An upwardly foldable member is connected at its proximal end to the hinge on the distal end of the slidable member. A table is connected by a second hinge to the distal end of the foldable member so that it is foldable to a raised generally horizontal table in front of the seat.

In one preferred configuration, the upwardly foldable member is foldable to an angled position at about 90° to the generally horizontally-disposed, slidable member so that the foldable member is thereby disposed in a generally upright or vertical position. The table is connected by the second hinge to a distal end of the foldable member so that the table may be folded at about 90° to the vertically disposed foldable member. An angle adjustment mechanism allows the angle of the tabletop to be adjusted relative to the slidable member within a predetermined range of angular positions.

In use, the slidable member of the portable folding table of the present invention is positioned on a conventional chair seat, on or under a conventional sofa cushion, on another seating device or on another seating surface such as a bed or a floor. The user sits on the seat placed on the chair or placed on the sofa cushion and positions the slidable member between the user's legs. The weight of the user sitting on the seat temporarily anchors and stabilizes the slidable member and the portable table assembly. The slidable member is extended from the seat until the table surface is positioned at a desirable distance from the user. The angle between the table surface and horizontal is adjusted until the angle is satisfactory.

In the case of embodiment of the invention comprising a unique game table for use with video game controls, the angle is advantageously adjustable by the user for convenient access to all elements of the controls whether steering wheel, joy stick, finger buttons, or palm contact with a tracking ball or other physical contact and operation of the game controls.

BRIEF DESCRIPTION OF THE DRAWINGS

A more complete understanding of the present invention and of these and other objects and advantages of the present invention may be had by reference to the following Detailed Description claims and Drawings wherein like numerals represent like elements and wherein:

DETAILED DESCRIPTION OF THE INVENTION

Figure 2:
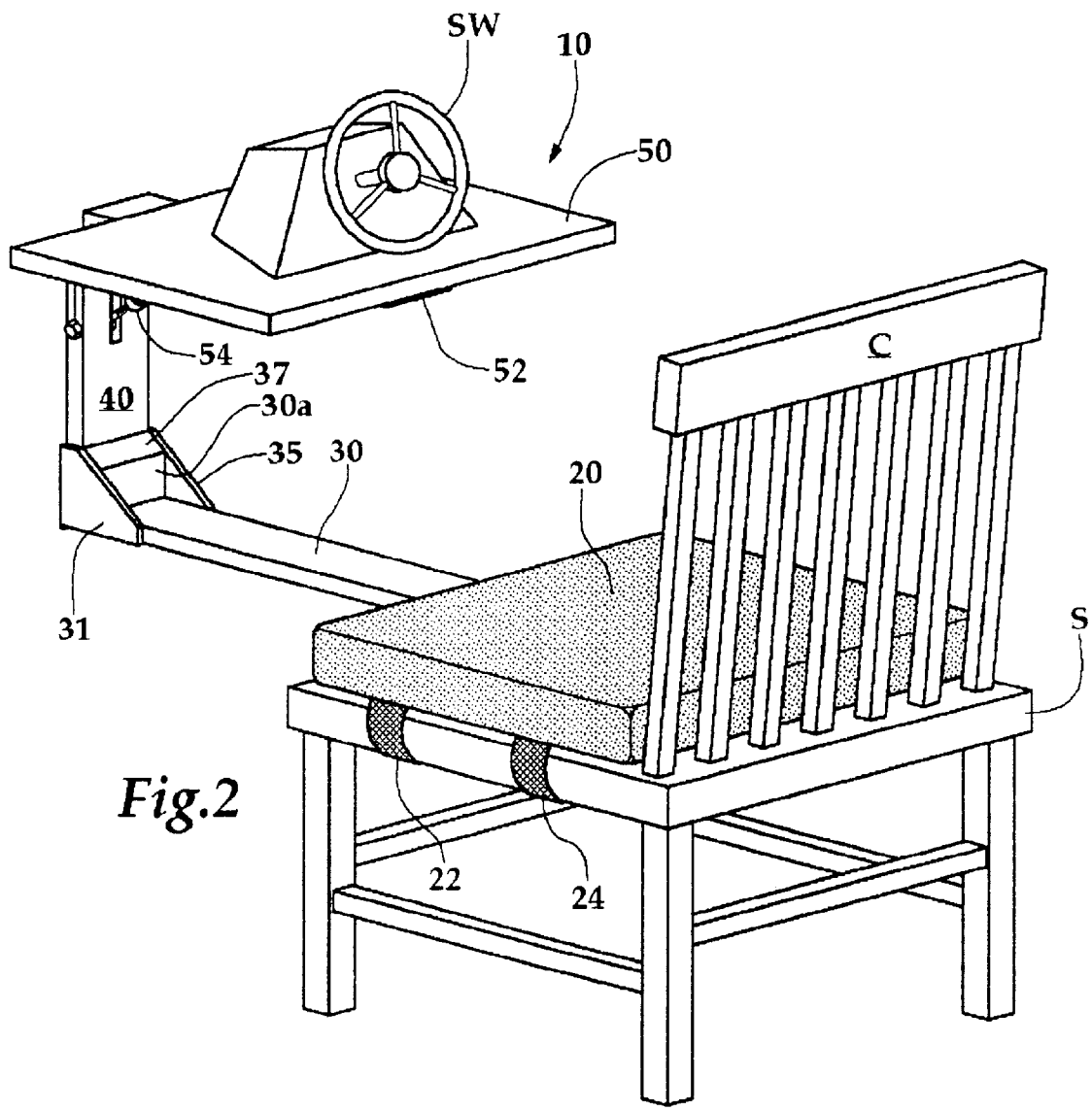
FIG. 2 is a perspective view of a portable game table according to a particular embodiment of the invention illustrated in use with a standard chair and a video game control mechanism.

Reference is now made to the Drawings wherein like reference characters denote like or similar parts throughout the Figures. Referring now to FIG. 2, wherein a portable table assembly 10 according to the present invention, is illustrated positioned on a standard straight chair C. The present invention is especially adaptable as a portable game table for use with video game controller, such as the steering wheel controller SW (depicted by way of example to demonstrate certain advantage of the invention as a game table). It will be understood by those skilled in the art that while the present invention 10 may have inventive features advantageous for use as a play or work surface for any number of purposes, it also has specific inventive features with particular advantages as a unique game table to provide a convenient, portable and adjustably positionable support surface for video game controllers.

Figure 1:
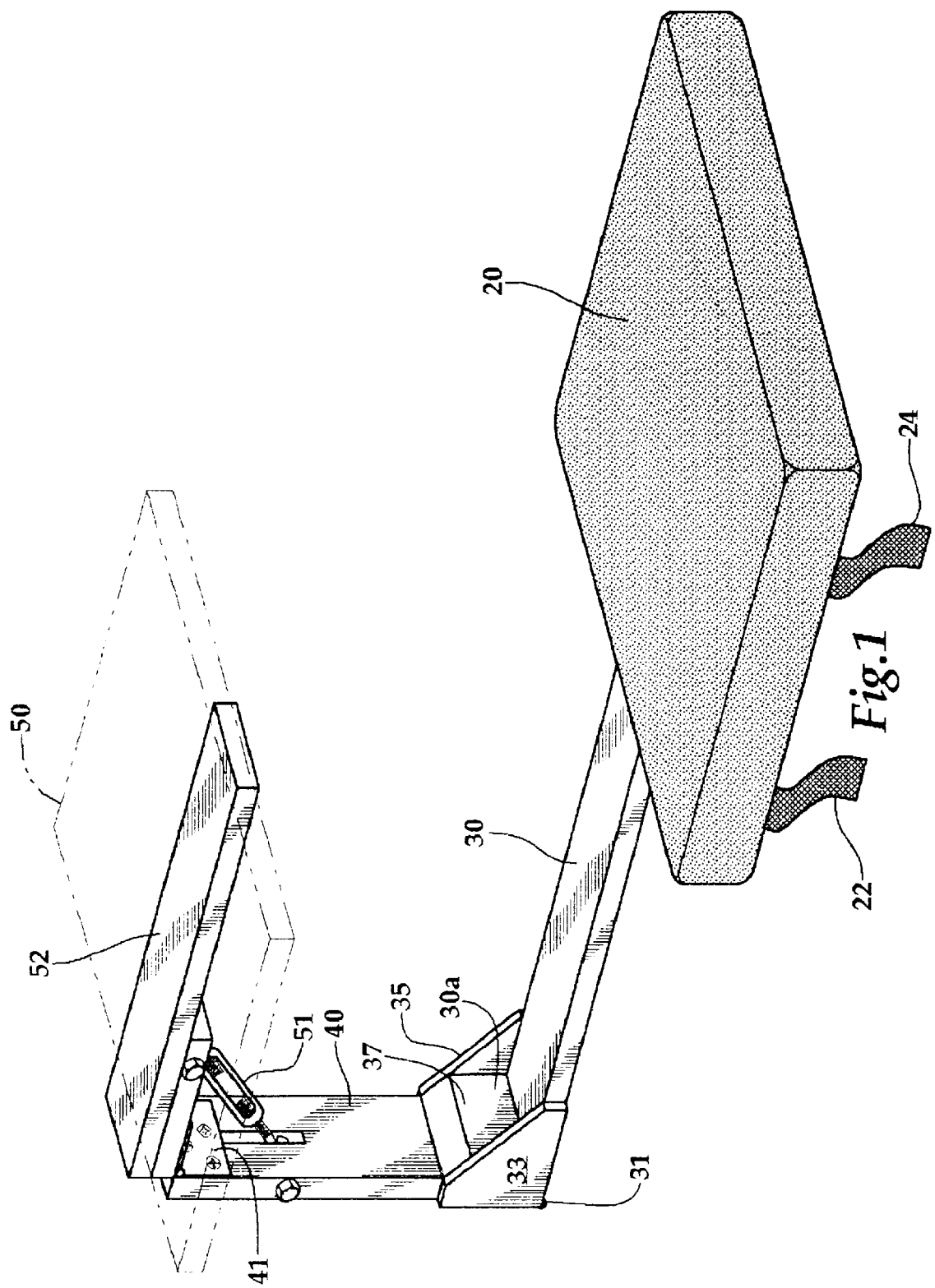
FIG. 1 is a perspective view of a portable table of the present invention in a folded, open position with the table surface illustrated in phantom.

Referring now to FIGS. 1 and 2 it can be seen that the seat 20 of portable table assembly 10 is an element of the present invention and is not permanently attached to the chair bottom S of chair C. Straps 22 and 24 may be used to attach the table seat 20 to the chair bottom S of chair C.

Figure 4:
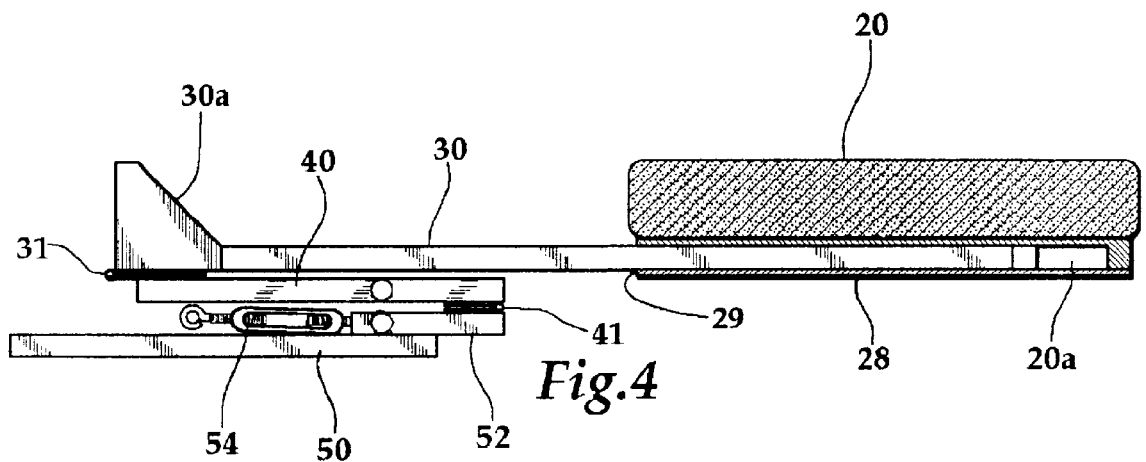
FIG. 4 is a side view of the portable table of FIG. 1 folded into a first alternative closed position.
Figure 5:
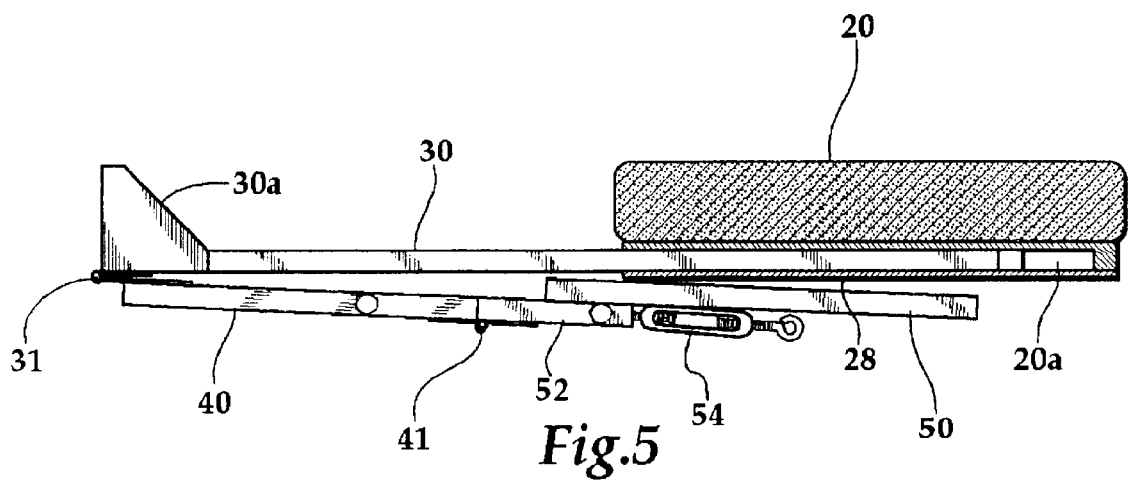
FIG. 5 is a side view of the portable table of FIG. 1 folded into an alternative second closed position.

In use, the table seat 20 of the portable table assembly 10 of the present invention is positioned on the chair bottom of a conventional chair, on a conventional sofa cushion or on other known seating devices or on another seating surface such as a bed or floor. A user sits on the seat and positions a slidable member 30 between the user's legs. The weight of the user sitting on the seat 20 temporarily anchors and stabilizes the portable table assembly 10 to the seating device. Straps 22 and 24 may be used to connect the seat 20 to chair bottom S for additional stability, especially with small, lightweight children. The slidable member 20 is extended from the seat until a tabletop 50 is positioned at a desirable distance from the user. The angle between the table 50 and horizontal is adjusted until the angle is satisfactory. The adjustment of the angle is particularly advantageous for achieving a desired position for games or game controls allowing access to all control features. As illustrated in FIGS. 4 and 5, it can be seen that the table is conveniently portable and when not in use the present invention may be folded compactly for storage and/or transportation.

Figure 3:
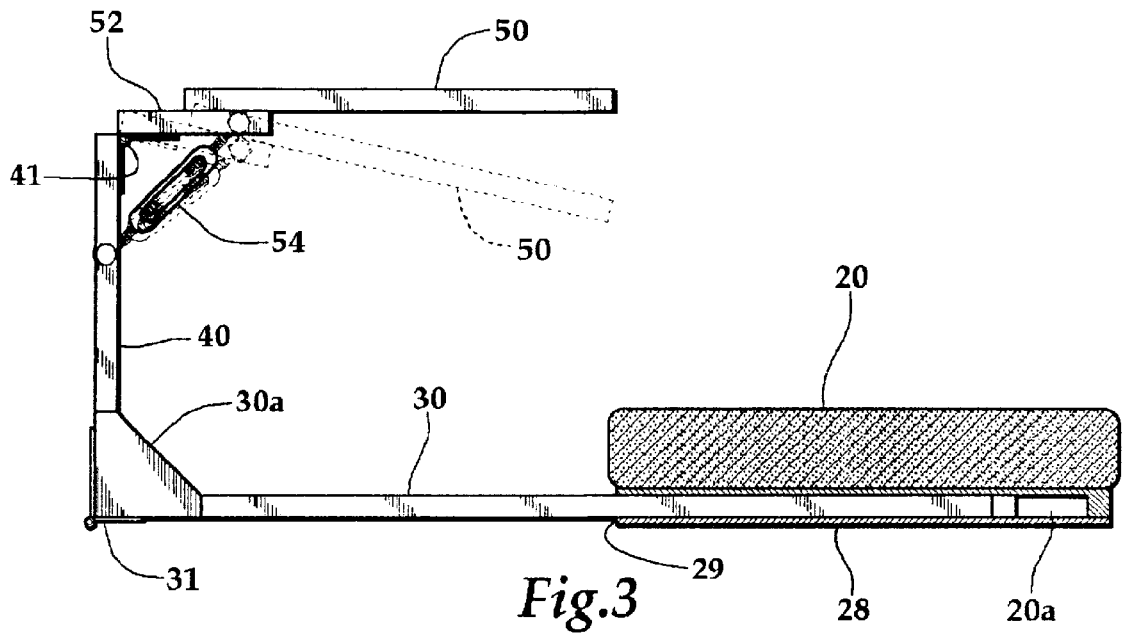
FIG. 3 is a side view of the portable table of FIG. 1 in an open position for use.
Figure 6:
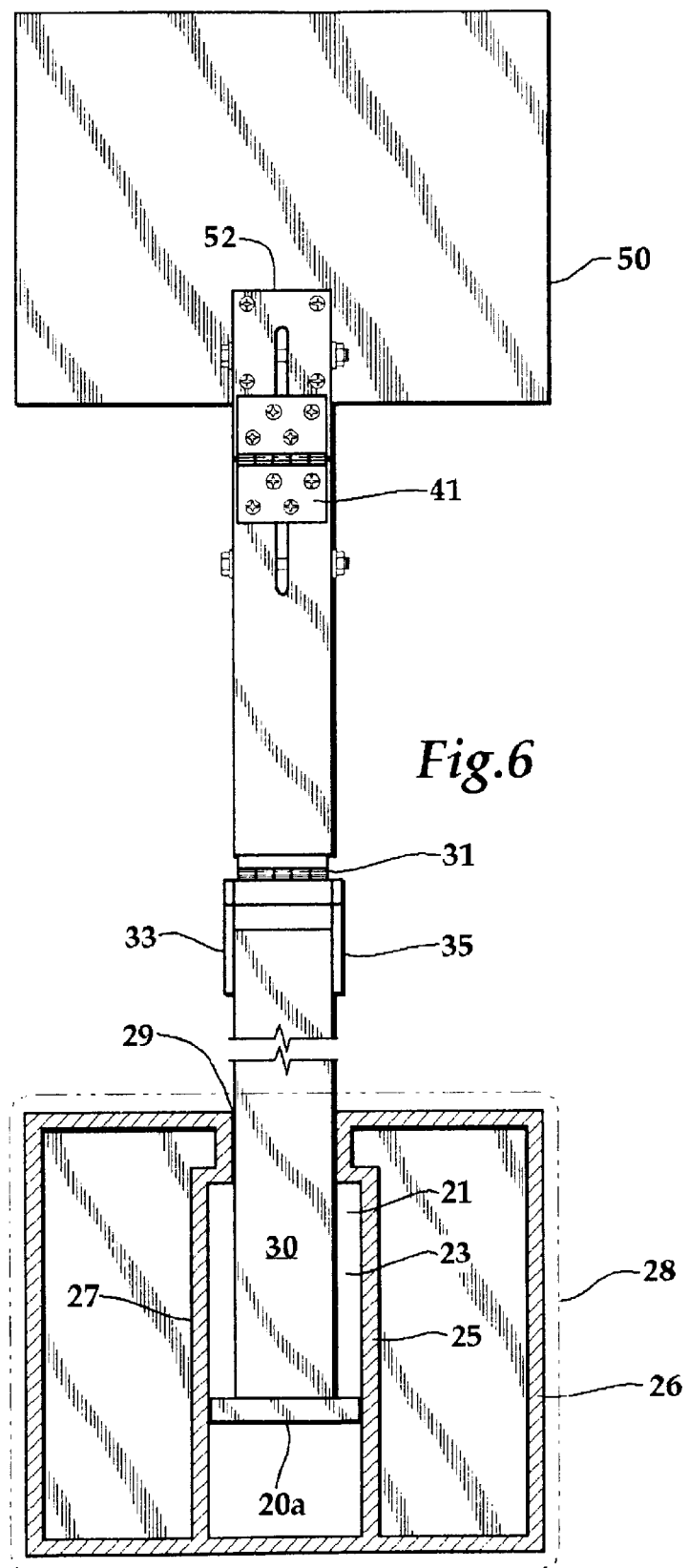
FIG. 6 is a bottom view of the portable table of the present invention showing a slide member having a stop to prevent over extension.

Referring now to FIGS. 1, 3 and 6, it can be seen that the present invention comprises the seat portion 20. The seat portion shown may be made from a wood or metal frame 26 and it may be padded and provided with a fabric or polymeric covering (FIG. 6) or the seat can be formed integrally with the frame from molded polymeric material. The seat portion includes slide guides 25 and 27 which define a cavity 21 for receiving the slidable member 30 through opening 29 in the front of the seat 20. A stop 20a is disposed on the proximal end of the slidable member 30 for adjustment against an end of cavity 21. The stop prevents the member 30 from sliding completely out of slide guides 25 and 27 and out the opening 29. A planar base plate 28 (illustrated in phantom in FIG. 6) is used to cover the bottom of the seat 20 and to enclose the cavity 21.

A first hinge 31 is disposed on the distal end of the slidable member 30. The hinge 31 movably connects a proximal end of the foldable member 40 to the slidable member 30. The hinge 31 allows the present invention 10 to be folded compactly for transportation and/or storage (see FIGS. 4 and 5). A second stop 30a is disposed at the distal end of the slidable member 30. The stop 30a prevents angular movement of the foldable member 40 in the direction of the front of the seat 20 past a predetermined angle. Preferably, the stop angle is generally vertical or at about 90° relative to slide member 30. The stop 30a may comprise two angular brace members 33 and 35 disposed at the distal end of slidable member 30 with a block 37 positioned there between. When foldable member 40 is positioned in an upright or generally vertical position the member 40 contacts the block 37 and angular movement in the direction toward the seat 20 is stopped at the predetermined angle. It will be understood by those skilled in the art that various hinge mechanisms may be used which will allow the slidable member 30 and the foldable member 40 to be adjusted in various positions with respect to each other both while the present invention is in use or for transportation/storage. It will also be understood that various stop mechanisms and/or latch devices may be used to temporarily fix the foldable member 40 with respect to the slidable member 30 during use of the invention. In the embodiment shown, the weight of the table holds the foldable member 40 against the second stop 30a.

A second hinge 41 is disposed at the distal end of foldable member 40. The second hinge 41 movably connects the tabletop 50 to the foldable member 40. When in use, the tabletop 50 is folded to a generally horizontal position or generally parallel to the slidable member 30 and generally perpendicular to foldable member 40. Thus, the tabletop is positioned in a plane generally parallel to the plane of the seat 20. (See FIGS. 1, 2, and 3.) When not in use the tabletop 50 may be folded toward the member 40 for compact storage or transportation (See FIGS. 4 and 5). The table 50 may be formed from wood, metal or polymeric material. The table 50 may be attached directly to the hinge 41 or the table 50 may be attached to a support member 52 which in turn is attached to the hinge 41.

The table 50 is secured in a generally horizontal position by adjustment mechanism 54. As illustrated in FIG. 3 angle adjustment mechanism 54 may be advantageously provided so that the top surface of table 50 may be selectively positioned at various angles, not exactly horizontal but within a predetermined range of angles, for a desired angle of presentation to a user seated on the seat 20. In the embodiment illustrated herein, the adjustment mechanism 54 comprises a conventional turnbuckle attached at a first end to the foldable member 40 and detachably attached at a second end to support member 52. The turnbuckle may be attached directly to the table 50 in an embodiment that does not include support member 52. By adjusting the turnbuckle in or out, the angle of the table 50 with respect to the foldable member 40 is adjusted, thereby, in turn adjusting the angle of the top surface of the table 50 with respect to the seat 20. To allow the table assembly to be folded closed, the turnbuckle is conveniently disengaged by lifting the table slightly and pushing an end of the turnbuckle off of a connection pin either at the table end or at the foldable member end. It will be understood by those skilled in the art that various selectively engagable mechanisms may be used to adjustably support the table in a range of angled positions for use and to allow folding it closed for portability or storage. It will also be understood that various adjustment assemblies may be used to temporarily fix the tabletop 50 at various angles with respect to the foldable member 40 during use of the invention.

It will be understood that the present invention may be constructed from wood members with metal hinges or alternatively any or all of the members may be formed from polymeric materials or metallic members having sufficient strength and durability.

Although preferred embodiments of the invention have been illustrated in the accompanying Drawings and described in the foregoing Detailed Description, it will be understood that the invention is not limited to the embodiments disclosed but is capable of numerous modifications without departing from the scope of the invention as claimed.

I claim:

1. A portable table for attachment to an existing chair, said portable table comprising:

a seat;

straps secured to said seat for attachment to said existing chair;

a slidable member disposed in a plane generally parallel to said seat, said slidable member slidably having a proximal end connected to said seat and having a distal end slidable to a position space generally in front of said seat;

a first hinge attached to said distal end of said slidable member and having a closed hinge position and an open hinge position;

a foldable member having a proximal end and a far end attached at said proximal end to said first hinge such that when said first hinge is in its open hinge position, said foldable member is disposed upwardly from the slidable member, said foldable member also having a second hinge attached at a far end, said second hinge having a closed hinge position and an open hinge position; and a table attached to the said second hinge on said far end of said foldable member, such that when said first and second hinges are in their respective open hinge positions, said table is spaced apart in front of said seat and generally parallel thereto.

2. A portable table comprising:

a seat;

a slidable member disposed projecting forward of said seat. said slidable member slidably having a proximal end connected to said seat and having a distal end slidable to a position space generally in front of said seat;

a stop disposed on said proximal end of the slidable member, wherein said stop prevents movement of said slidable member away from the front of said seat beyond a predetermined forward position;

a first hinge attached to said distal end of said slidable member and having a closed hinge position and an open hinge position;

a foldable member having a proximal end and a far end attached at said proximal end to said first hinge such that when said first hinge is in said open hinge position, said foldable member is disposed upwardly from the slidable member, said foldable member also having a second hinge attached at a far end, said second hinge having a closed hinge position and an open hinge position; and a table attached to the said second hinge on said far end of said foldable member, such that when said first and second hinges are in said respective open hinge positions, said table is spaced apart in front of said seat and generally parallel thereto.

3. The portable table of claim 2 further comprising an angle stop disposed on said distal end of said slidable member wherein said angle stop contacts said foldable member and prevents hinged movement of the foldable member beyond a predetermined angled position toward the front of said seat.

4. The portable table of claim 2 further including an adjustment assembly connected between said table and said foldable member to permit adjustment of the open position angle there between, so that said table is presented at a desired angle relative to said slidable member and said seat.

5. A portable table assembly comprising:

a seat having a top, a front, and an internal cavity, said front having an opening connected to said internal cavity;

a slidable member having a proximal end and a stop disposed on said proximal end, and having a distal end and a first hinge disposed at said distal end, said stop and said proximal end of said slidable member being disposed in said cavity in said seat, said slidable member extending through said opening of said front of said seat, and said first hinge and distal end being disposed in front of said front of said seat;

a foldable member connected at a proximal end to said first hinge of said slidable member, said foldable member having a distal end and a second hinge disposed at said distal end wherein when in use said foldable member is disposed upwardly from said slidable member; and a table connected to said second hinge on said distal end of said foldable member.

6. The portable table of claim 5 further comprising an angle stop disposed on said distal end of said slidable member wherein said angle stop contacts the foldable member and prevents angular movement of the foldable member toward said front of said seat beyond a predetermined position.

7. The portable table assembly of claim 5 further including an adjustment mechanism connected between said table and said foldable member.

8. The portable table of claim 5 wherein said slidable member comprises an elongated member having a rectangular cross-section there along slidably held in said internal cavity, said opening of said internal cavity having a rectangular cross-section corresponding to said uniform rectangular cross-section of said elongated member for guide sliding there along.

9. A portable table assembly comprising:

a seat having a top, a front, and an internal cavity, said front having an opening connected to said internal cavity;

a slidable member having a proximal end and a stop disposed on said proximal end, and having a distal end and a first hinge disposed at said distal end, said stop and said proximal end of said slidable member being disposed in said cavity in said seat, said slidable member extending through said opening of said front of said seat, and said first hinge and distal end being disposed in front of said front of said seat, and wherein said slidable member comprises an elongated member having a rectangular cross-section there along slidably held in said internal cavity, said opening of said internal cavity having a rectangular cross-section corresponding to said uniform rectangular cross-section of said elongated member for guided sliding there along;

a foldable member connected at a proximal end to said first hinge of said slidable member, said foldable member having a distal end and a second hinge disposed at said distal end wherein when in use said foldable member is disposed upwardly from said slidable member;

a table connected to said second hinge on said distal end of said foldable member;

an angle stop disposed on said distal end of said slidable member wherein said angle stop contacts the foldable member and prevents angular movement of the foldable member toward said front of said seat beyond a predetermined position; and an adjustment mechanism connected between said table and said foldable member.

* * * * *